T. L. WHITE & A. P. ELTEN.
DEHYDRATING MILK.
APPLICATION FILED AUG. 9, 1909.
956,246.
Patented Apr. 26, 1910.
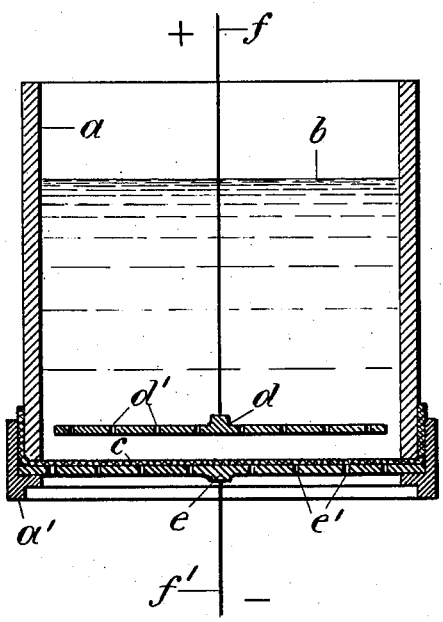
Witnesses:
N. A. Sheedy
John J. Belz
Inventors:
Thomas L. White
Alfred P. Elten

UNITED STATES PATENT OFFICE.

THOMAS L. WHITE AND ALFRED P. ELTEN, OF NEW YORK, N. Y.

DEHYDRATING MILK.

956,246. Specification of Letters Patent. Patented Apr. 26, 1910.

Application filed August 9, 1909. Serial No. 512,039.

*To all whom it may concern:*

Be it known that we, THOMAS L. WHITE, a subject of the King of Great Britain, and ALFRED P. ELTEN, a citizen of the United States, both residents of New York, N. Y., have invented new and useful Improvements in Dehydrating Milk; and we do hereby declare that the following is a full, clear, and exact description of the invention, such as will enable others skilled in the art to which it appertains to make and use the same, reference being had to the accompanying drawing, which forms part of this specification.

This invention relates, principally, to the art of de-hydrating or concentrating milk, by which is meant the removal from milk of the major portion of its water content, the casein, albumen and other "milk solids" being substantially retained in the thus condensed product.

The object of our invention is, primarily, to effect the de-hydration of milk without the use of heat in such a manner that the properties, chemical, physical and physiological, of the original milk remain unimpaired.

In all processes of concentrating milk with which we are acquainted the water is removed in a state of vapor, a source of heat being necessary, the heat potential maintained depending on the pressure at which the operation of evaporation is conducted. Moreover, whatever care be taken to prevent undue heating, it would seem that the heat is never without some prejudicial effect on the product, especially in the case of such evasive and little understood, though most important milk properties as enzym reaction, germicidal function, and the like.

In our process we eliminate heat altogether as a necessary step in the operation of de-hydration and we are enabled to do this because by our discovery we can remove the water as water without first changing its physical state of molecular aggregation. In consequence there is never a moment during the process of de-hydration as we conduct it when a heat condition exists or is set up sufficiently abnormal to result in an abnormal product. The water, so to speak, flows out of the milk, leaving all residuals in *statu quo normali*.

The basic principle of our discovery depends on the selective action of a diaphragm which is pervious to water but impervious to colloidal solutions, such as is used in the operation practiced and known in chemistry as dialysis. A diaphragm of this kind is sold by chemical apparatus purveyors under the name of "vegetable parchment." It differs from a filter, however fine, in that it is impermeable to substances actually dissolved and not merely to substances which are very finely divided and as such held in solution. It also differs from a "semi-permeable" diaphragm in that it is permeable to so-called crystalloids. Our process further depends on the use of electrical endosmosis, this being in our experience an adequate method by which the necessary migration of the water molecules in the milk, through the diaphragm, can be effectively maintained.

In the accompanying drawing, which forms part of this specification, an apparatus, shown in vertical section, represents one way in which our invention may be carried into practice, the arrangement of the parts being more or less diagrammatic.

Referring now to this drawing, the body part of a vessel $a$, the bottom of which is formed by a dialyzing diaphragm or vegetable parchment as $c$, that is held in place by a ring, as $a'$, serves to hold the milk, as $b$, in which latter electrode $d$ having perforations $d'$ is held suspended, while electrode $e$ is held in contact with diaphragm $c$. Wires $f$ and $f'$ connect electrodes $d$ and $e$, respectively, with a source of electricity. On passing an electric current from the milk through the diaphragm to electrode $e$, the water in the milk will pass through diaphragm $c$ and the perforations $e'$ of electrode $e$, the "milk solids" being retained in vessel $a$, not being able to pass through the dialyzing membrane.

We do not wish to be confined to membranes or diaphragms of the nature or construction as above described, but broadly claim the use of any diaphragm that exercises a selective action in conjunction with electrical endosmosis through which latter such a diaphragm is rendered operative, for the purpose specified.

We claim and desire to secure by Letters Patent the following:

1. The method of de-hydrating milk, which consists in expelling water out of the milk by means of electrical endosmosis.

2. The method of de-hydrating milk, which consists in causing the water in the milk to pass from its container through a dialyzing diaphragm, while the milk solutes are substantially retained in said container.

3. The method of de-hydrating milk, which consists in expelling the water out of the milk by means of electrical endosmosis used in conjunction with a diaphragm substantially impervious to milk solutes.

4. In the art of de-hydrating milk, the use of a diaphragm that acts selectively against colloids contained in the milk.

In testimony whereof we have affixed our signatures to this specification in the presence of two subscribing witnesses.

THOMAS L. WHITE.
ALFRED P. ELTEN.

Witnesses:
M. A. CASE,
N. M. DE BOIS.